No. 621,995. Patented Mar. 28, 1899.
E. C. DOOLITTLE.
BICYCLE.
(Application filed Feb. 24, 1898.)
(No Model.)
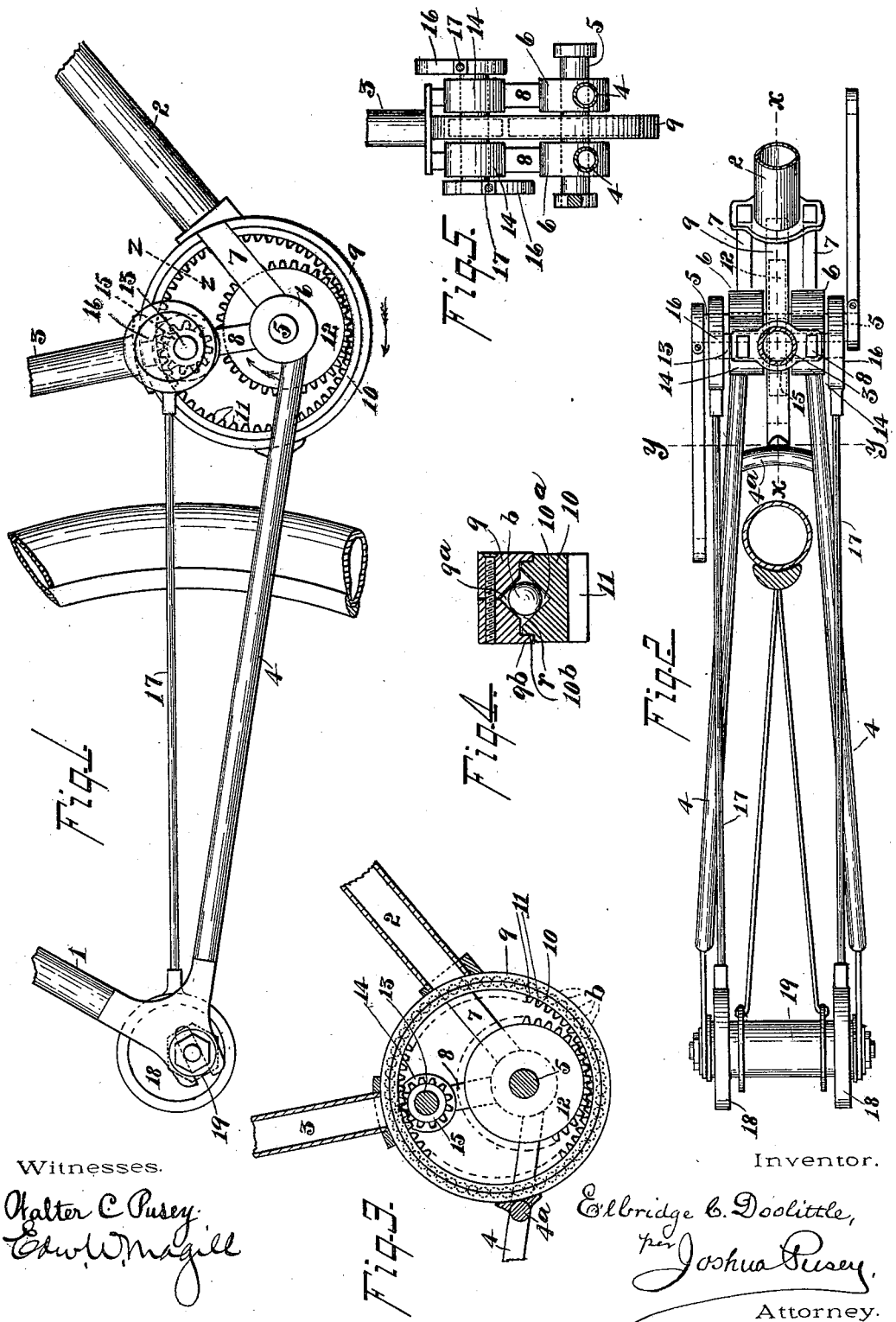
Witnesses.
Walter C. Pusey
Edw. W. Magill
Inventor.
Elbridge C. Doolittle,
per Joshua Pusey,
Attorney.

UNITED STATES PATENT OFFICE.

ELBRIDGE C. DOOLITTLE, OF PHILADELPHIA, PENNSYLVANIA, ASSIGNOR OF ONE-HALF TO ALFRED R. JUSTICE, OF SAME PLACE.

BICYCLE.

SPECIFICATION forming part of Letters Patent No. 621,995, dated March 28, 1899.

Application filed February 24, 1898. Serial No. 671,423. (No model.)

*To all whom it may concern:*

Be it known that I, ELBRIDGE C. DOOLITTLE, a citizen of the United States, residing in the city and county of Philadelphia, State of Pennsylvania, have invented certain new and useful Improvements in Bicycles, of which the following is a full, clear, and exact description, reference being had to the accompanying drawings, of which—

Figure 1 is a side elevation of part of a bicycle having my invention applied thereto; Fig. 2, a plan view of Fig. 1; Fig. 3, a section on line $xx$, Fig. 2; Fig. 4, a section, enlarged, on line $zz$, Fig. 1; Fig. 5, a section on line $yy$, Fig. 2, looking toward the front.

The object of this invention is to provide a bicycle driving mechanism that shall be efficient, readily constructed, capable of being made practically dirt-proof, smooth and noiseless in operation, not liable to get out of order, and which may be applied to bicycles of the type most generally in use with comparatively little change in the frame of the machine.

The exact nature of the invention will appear from the following description, reference being had to the accompanying drawings, in which—

1 is the rear bar of the frame of a safety-bicycle; 2, the forward bar; 3, the middle, and 4 the rear fork or backstay.

In adapting my driving mechanism to the machine I make the hub of the usual pedal crank-shaft 5 in two parts or barrel-sections 6, as seen in Figs. 2 and 5, and I provide the lower ends of the frame-pieces 2 and 3 with bifurcations, (marked 7 and 8,) respectively, which are firmly united to the hub, the ends of the bifurcations on one side being secured to the hub-section on that side and the bifurcations on the other side to the corresponding hub-section. Between these bifurcations and in a vertical plane bisecting the axis of the hub-sections and the middle of the hub of the rear wheel of the bicycle I place a ring 9, which is firmly attached by rivets, screws, brazing, or other suitable means to the frame-pieces 2 and 3, as also to the cross-bar $4^a$, Figs. 2 and 3, of the rear fork. Within this ring is fitted a rotatable wheel or annulus 10, having internal teeth 11. The ring is so placed that the pedal crank-shaft is below the center and near the bottom thereof and at the center or bottom angle of the frame, whereby the entire strain comes upon the frame and not upon the annulus.

In order to reduce friction to a minimum, I make opposite grooves $9^a$ $10^a$, Fig. 4, in the inner face of the ring and the outer face of the annulus, respectively, whereby when the two parts are put together these grooves form a raceway $r$, which is filled with balls $b$, such as are generally used in ball-bearings. The annulus is maintained in place laterally by means, in the present instance, of offsets $10^b$, adapted to receive lateral flanges $9^b$ of the fixed ring. The balls may be inserted into the raceway through an aperture in the face of the ring, (afterward plugged up,) or the ring may be made in two parts, which are screwed or riveted together after the balls have been inserted, as seen in Fig. 4.

Upon the pedal crank-shaft 5 and between the hub-sections is mounted a gear 12, whose teeth engage those of the annulus 10, and upon a shaft 13, that is journaled in bearings mounted in barrel-casings 14 of the bifurcations 8 of the frame-bar 3, is a pinion 15, whose teeth also engage those of the annulus.

Upon each of the projecting ends of the pinion-shaft is a ball-bearing strap-eccentric 16, which is connected by a rod 17 with a similar eccentric 18, mounted on the ends of the hub 19 of the rear wheel of the bicycle.

Having thus described the construction of my invention, the operation is as follows: Upon rotating forward the pedal crank-shaft 5 in the usual way the gear 12 thereon turns the annulus 10, as indicated by the arrows in Fig. 1, thus rotating the pinion and eccentric-shaft 13, and so driving the bicycle forward by the eccentrics and their connecting-rods. The sides of the annulus and the gears are inclosed by suitable plates (not shown) secured to the sides of the ring 9, whereby the parts are incased, and so protected from dust and dirt. This casing would also be made sufficiently tight to hold a quantity of oil on the bottom, whereby the surfaces in frictional contact would be constantly lubricated.

Having thus described my invention, I claim as new and desire to secure by Letters Patent—

1. In a cycle driving mechanism, the combination with the frame having the hanger or hub in two separated barrel-sections, the bifurcated frame-pieces connected to said sections, and the ring secured to the frame with its center above the center of the said hub or hanger, of the crank-shaft having the gear-wheel, the shaft journaled in the frame above the crank-shaft, the pinion thereon, the rotatable internally-toothed annulus mounted in said ring and engaged by the said pinion and the said gear-wheel, the eccentrics on the end of the pinion-carrying shaft, the similar eccentrics on the rear-wheel hub, and the connecting straps and rods, substantially as specified.

2. In a cycle driving mechanism, the combination with the frame having its hub formed in two separated barrel-sections, the bifurcated seat-post whose bifurcations are connected to the respective sections, and having barrel-casings formed thereon above the barrel-sections of the hub, and the ring secured to said frame between said sections and casings, with its center above the center of said hub or casing, of the rotatable internally-toothed annulus mounted in the said ring, the shaft journaled in said casings, the pinion on said shaft engaging the teeth of said annulus, which is geared to the crank-shaft, and the connected eccentrics on the pinion-shaft and rear-wheel hub, respectively, substantially as specified.

In testimony whereof I have hereunto affixed my signature this 21st day of February, A. D. 1898.

ELBRIDGE C. DOOLITTLE.

Witnesses:
  WALTER C. PUSEY,
  JOSHUA PUSEY.